US 8,898,206 B1

(12) United States Patent
Jiang et al.

(10) Patent No.: US 8,898,206 B1
(45) Date of Patent: Nov. 25, 2014

(54) MECHANISM FOR DISTRIBUTED INODE TO PATH TRAVERSAL IN A STRIPED VOLUME SYSTEM

(75) Inventors: Tianyu Jiang, Cranberry Township, PA (US); Richard P. Jernigan, IV, Cranberry Township, PA (US); Ananthan Subramanian, Sunnyvale, CA (US); Wesley Witte, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 734 days.

(21) Appl. No.: 12/769,360

(22) Filed: Apr. 28, 2010

(51) Int. Cl.
G06F 17/30 (2006.01)

(52) U.S. Cl.
CPC .................. G06F 17/3012 (2013.01)
USPC ........... 707/822; 707/797; 707/827; 707/829; 711/118

(58) Field of Classification Search
CPC ................... G06F 17/30144; G06F 17/30171; G06F 17/3012
USPC .................. 707/797, 822, 827, 829; 711/118
See application file for complete search history.

(56) References Cited

U.S. PATENT DOCUMENTS

| | | | | |
|---|---|---|---|---|
| 6,928,466 B1* | 8/2005 | Bulka et al. | | 709/213 |
| 6,980,994 B2* | 12/2005 | Shmueli | | 707/803 |
| 7,103,616 B1* | 9/2006 | Harmer et al. | | 1/1 |
| 7,293,150 B2* | 11/2007 | Witt et al. | | 711/170 |
| 2006/0179037 A1* | 8/2006 | Turner et al. | | 707/3 |
| 2006/0248273 A1* | 11/2006 | Jernigan et al. | | 711/114 |
| 2006/0288026 A1* | 12/2006 | Zayas et al. | | 707/101 |
| 2010/0082774 A1* | 4/2010 | Pitts | | 709/219 |

* cited by examiner

*Primary Examiner* — Shew-Fen Lin
(74) *Attorney, Agent, or Firm* — Cooper Legal Group, LLC

(57) ABSTRACT

The techniques introduced herein provide an efficient mechanism for reducing remote procedure requests to storage server nodes in a cluster of the storage servers to construct a directory path for a data container. According to one aspect of the invention, a new caching technique and an efficient organization of the cache memory are provided so that a cache memory on a storage server node is populated with individual path components of a directory structure. A novel cache invalidation mechanism is provided to maintain cache consistency at the cache so that when a path component changes, such as an identifier of a data container in the directory structure, and a path component is invalidated in the cache memory, the remaining path components can be retained and later reused.

20 Claims, 13 Drawing Sheets

INODE STRUCTURE 502

| | |
|---|---|
| METADATA SECTION | 503 |
| TYPE | 510 |
| TIME STAMP | 520 |
| GENERATION NUMBER | 533 |
| METADATA INVALIDATION FLAG | 534 |
| STRIPING EPOCH | 536 |
| INODE TO PATH COOKIE | 555 |
| PARENT INUM | 556 |
| VOLUME INDEX | 557 |
| ENTRY INDEX IN PARENT DIRECTORY | 558 |
| DATA SECTION | 560 |

FIG. 5

Sub 1

| DATA CONTAINER IDENTIFIER | INUM |
|---|---|
| "Sub 2" | 200 |
| "Sub 2a" | 250 |

FIG. 7

CACHE MEMORY 225

| VOLUME INDEX | INUM | PARENT INUM | IDENTFIER IN PARENT DIRECTORY |
|---|---|---|---|
| 1024 | 400 | 300 | "hello.txt" |
| 1024 | 300 | 200 | "Sub 3" |
| 1024 | 350 | 200 | "Sub 3a" |
| 1024 | 200 | 100 | "Sub 2" |
| 1024 | 250 | 100 | "Sub 2a" |
| 1024 | 100 | 64 | "Sub 1" |
| | | | |
| | | | |
| | | | |

FIG. 10

CACHE MEMORY 225

| VOLUME INDEX | INUM | PARENT INUM | IDENTFIER IN PARENT DIRECTORY |
|---|---|---|---|
| 1024 | 400 | 300 | "hello.txt" |
| 1024 | 300 | 200 | "Sub 3" |
| 1024 | 350 | 200 | "Sub 3a" |
|  |  |  |  |
| 1024 | 250 | 100 | "Sub 2a" |
| 1024 | 100 | 64 | "Sub 1" |
|  |  |  |  |
|  |  |  |  |
|  |  |  |  |
|  |  |  |  |

FIG. 12

MECHANISM FOR DISTRIBUTED INODE TO PATH TRAVERSAL IN A STRIPED VOLUME SYSTEM

FIELD

Embodiments of the inventive principles described herein relate to network storage servers, and more particularly, to a technique for optimizing lookup of components of a hierarchical directory structure striped across volumes in the cluster of storage servers.

BACKGROUND

A storage server operates on behalf of one or more clients on a network to store and manage data in a set of mass storage devices. A plurality of storage server nodes can be interconnected to provide a storage server environment configured to service many clients. Each storage server node can be configured to service one or more volumes, wherein each volume stores one or more data containers (e.g., files, logical units, etc.). The volumes can be organized as a striped volume set (SVS) and data containers can be striped among the volumes in the SVS so that differing portions of the data container can be stored at different volumes. This, in turn, distributes the data access requests, along with the processing resources needed to service such requests, among all of the storage server volumes.

A file system logically organizes file-related information (such as directories, data containers and blocks) in a tree structure. A directory is an array, where each element in the array is a pair of mappings between an identifier of a data container and its inode number (i.e., an index of an inode data structure storing metadata attributes of the data container. Some of the common operations performed against directories are create (making a new entry in the directory), unlink (removing an existing entry), lookup (finding the inode number that matches a data container name) and readdir (enumerating all entries in the directory).

When a data container is created within a parent directory, an entry is stored within the parent directory. The entry represents a mapping between an identifier of the data container, such as a name, and its inode number. The "data container identifier" as used herein can refer to the identifier of a data container, a directory, or subdirectory. Typically, all directory entries are stored on a single volume, which is serviced by one storage server node. The single volume provides all information necessary for resolving a path that includes multiple levels of directory names. A path, as used herein, is a general form of an identifier of a data container or of a directory name, which specifies its unique location in a file system.

When a great number of access requests are issued against a directory serviced by one storage node, a bottleneck can be created. To resolve the bottleneck, NetApp, Inc.'s new technology stripes identifier-to-inode number mappings across a striped volume set. To stripe a directory, some of the directory's data container identifier-to-inode number mappings are stored on one volume while other entries are stored in another volume. The distribution of the mappings within the volumes can be based, for example, on a hash value of the data container name. Thus, the mappings necessary for providing a path to a data container may be distributed across multiple volumes. The hash value is used to identify the volume on which the mapping is stored.

Typically, the path leading to a data container or a directory has multiple path components from the root to the data container or directory itself. The path components (such as for example directory names) can change during the life cycle of a data container. Such a change needs to be reflected in subsequent path construction when the path of a data container needs to be reported to an application that has registered to receive updates about a data container. To construct a path to a data container or a directory, various path components are traversed in the hierarchical directory structure by identifying inode numbers of the path components. Since in a striped directory inode-to-identifier mappings can be stored on different volumes, a storage server node may need to communicate with more than one other node during the path construction process. Some identifiers (e.g., names of the directories near the root level) may need to be resolved repeatedly. Obtaining individual path components may result in issuing multiple remote procedure commands by storage server nodes to different volumes. This increased inter-node communication may reduce the system performance.

Accordingly, what is needed is a mechanism for reducing the path component lookup through remote procedure commands in a storage server in which identifier-to-inode number mappings are striped across volumes.

SUMMARY

Novel techniques introduced herein reduce inter-node communication in a cluster of storage server nodes to construct a directory path for a path component by caching individual path components at the storage nodes. The individually cached components are used to construct a directory path, thereby reducing the need to issue inter-node commands to retrieve the path components from one or more storage nodes. As used herein, a "path component" is a data container, a subdirectory, a directory, or a root directory. Caching individual path components involves caching identifier-to-inode number mappings striped across volumes in the cluster of storage server nodes. The identifiers may refer to the names of data containers, subdirectories, or directories.

According to one aspect of the invention, a hierarchical directory structure is iteratively traversed from a target inode (such as an inode that from which a path needs to be constructed) up to a specific parent of the target inode to identify path components. The identified path components, whose identifiers are striped across volumes in a cluster system, are cached at a storage node where the target inode resides. After the identifiers of the path components are cached at a storage node, the cached components are used to construct a directory path without accessing other storage nodes in the cluster. Caching individual components of the directory path provides multiple advantages. First, updating a cache memory to reflect changes to a path component(s) requires minimum invalidation of the cached components since only changed path components need to be invalidated rather than all the cached components. Furthermore, individually cached components can be efficiently used for multiple traversals of a directory structure with different starting points of traversal (e.g., data containers). When one traversal meets a parent directory which is common to another traversal, the two traversals share the same cached components from the parent directory to the root of the hierarchical directory structure. The cached entries include, in one implementation, an inode number of a parent of a target inode and the identifier of the target inode in the parent directory.

At least one useful application of the novel techniques described herein is providing a constructed directory path to an application, which is registered to receive updates to individual components in the directory path. Since individual path components are cached at a storage server node with which the application has registered to receive updates, the storage server node can construct the path without incurring significant inter-node communication overhead. Those skilled in the art would understand that multiple operations rely on efficient inode to parent path construction.

According to another aspect of the invention, a novel cache invalidation mechanism is provided so that cache consistency is maintained at the cache memory when individual path components are modified (such as an identifier of a data container, subdirectory, or a directory). To this end, rather than invaliding the entire path that includes the modified component, only the entry associated with the modified component is invalidated; the remaining entries associated with other components of the directory structure can be retained and later reused for subsequent path construction.

BRIEF DESCRIPTION OF THE DRAWINGS

One or more embodiments of the present invention are illustrated by way of example and not limitation in the figures of the accompanying drawings, in which like references indicate similar elements and in which:

FIG. 5 is a diagram of an inode structure for storing attributes of a data container stored at the clustered storage system;

FIG. 7 is a diagram illustrating exemplary entries in a directory structure;

FIG. 10 illustrates cache memory storing path components being built through an iterative process according to one embodiment;

FIG. 12 is a diagram illustrating entries in the cache memory resulting from the invalidation of some of the entries.

DETAILED DESCRIPTION

System Environment

Figure 1:
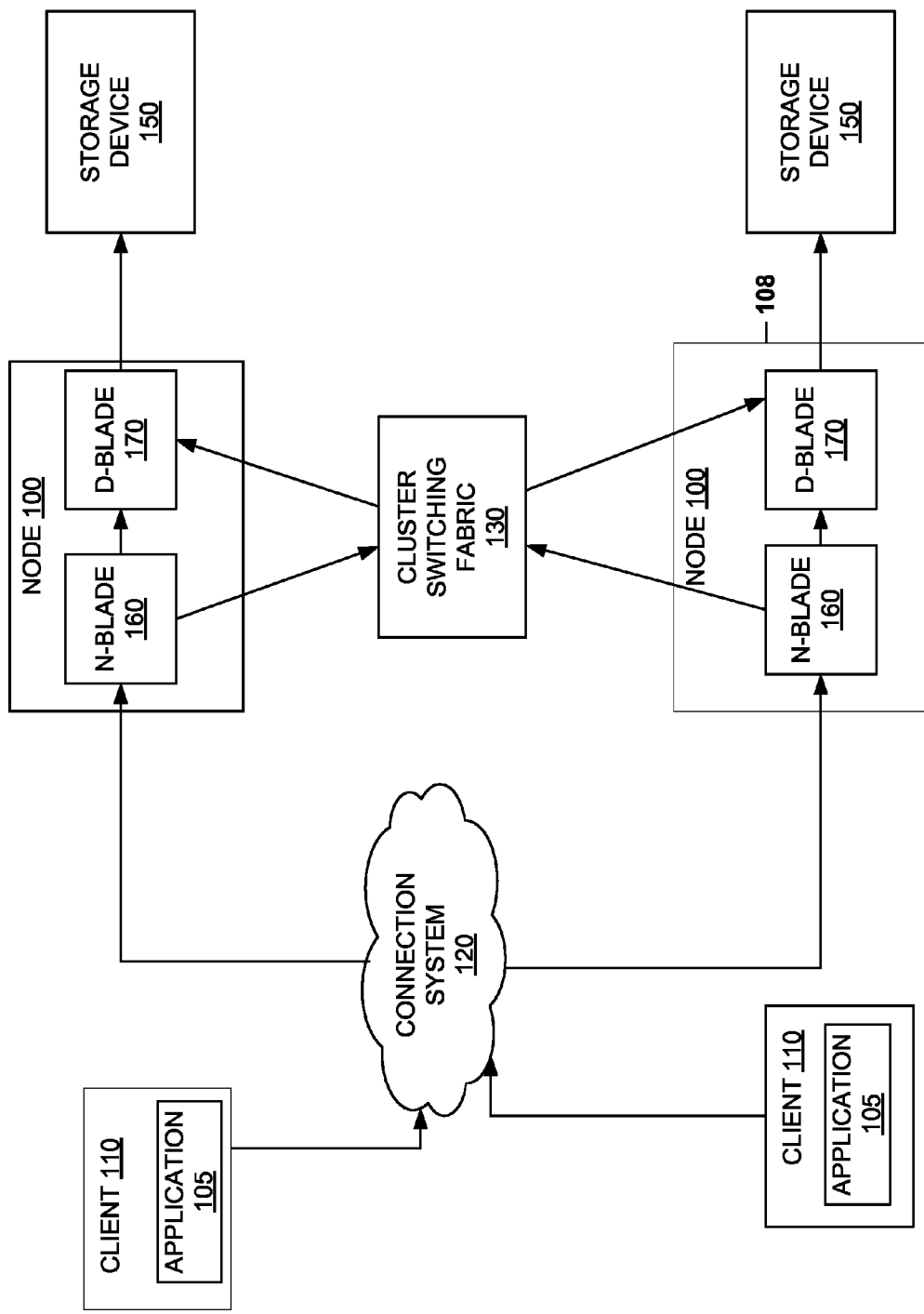
FIG. 1 is a diagram illustrating a plurality of nodes interconnected as a cluster in a clustered computing environment.

Before discussing the technique introduced here, it is useful to consider a computing environment in which the technique can be implemented. FIG. 1 shows such a computing environment, which includes a plurality of nodes 100 interconnected as a cluster of a clustered computing environment.

The nodes 100 are configured to provide storage services relating to the organization of information on storage devices. Some storage servers are designed to service file-level requests from clients, as is commonly the case with storage servers used in a network attached storage (NAS) environment. Other storage servers are designed to service block-level requests from clients, as with storage servers used in a storage area network (SAN) environment. Still other storage servers are capable of servicing both file-level requests and block-level requests, as is the case with certain storage servers made by NetApp, Inc., of Sunnyvale, Calif.

The nodes 100 include various functional components that cooperate to provide distributed storage server architecture of the cluster. Further, each node 100 is organized to include a network element ("N-blade") 160 and a data element ("D-blade") 170. The N-blade 160 includes functionality that enables the node 100 to connect to clients 110 over a connection system 120, while each D-blade 170 connects to one or more storage devices 150, such as disks of a disk array. Note that other types of storage devices, such as flash memory, tape storage, etc, could be used to store data. The nodes 100 are interconnected by a cluster switching fabric 130, which, in the illustrated embodiment, can be embodied as a Gigabit Ethernet switch.

The N-blades 160 and D-blades 170 cooperate to provide highly-scalable, distributed storage server architecture of a clustered computing environment implementing exemplary embodiments of the present invention. Note that while there is shown an equal number of N-blades and D-blades in FIG. 1, there may be differing numbers of N-blades and/or D-blades in accordance with various embodiments of the technique described here. For example, there need not be a one-to-one correspondence between the N-blades and D-blades. As such, the description of a node 100 comprising one N-blade and one D-blade should be understood to be illustrative only.

The clients 110 can be, for example, general-purpose computers configured to interact with the node 100 in accordance with a client/server model of information delivery. That is, each client 110 may request the services of the node 100 (e.g., to read or write data), and the node 100 may return the results of the services requested by the client 110, by exchanging packets over the connection system 120. The client 110 may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The client 110 may run an application (e.g., 105) that is interested in receiving notifications about modifications (updates) to directories and data containers stored on the D-Blade. To this end, application 105 resident on a client can register with the storage server by exposing Application Programming Interfaces (API) to the file system. A directory notification service is a mechanism by which a client can register with one or more storage servers in a cluster for notifications about accesses, changes, or modifications to a directory or to a data container within a directory in the hierarchical directory structure. Node 100 maintains associations between directories watched for modifications and applications that are registered to receive updates regarding modifications to directories (such associations are not shown in FIG. 1). An application can specify a set of conditions that trigger notification, such as changes to data container names, directory names, attributes, data container size, time of last write, and security. An application can be, for example, Windows Explorer®, provided by Microsoft Corporation of Redmond, Wash. Those skilled in the art would understand that other applications may register for notification services.

Figure 2:
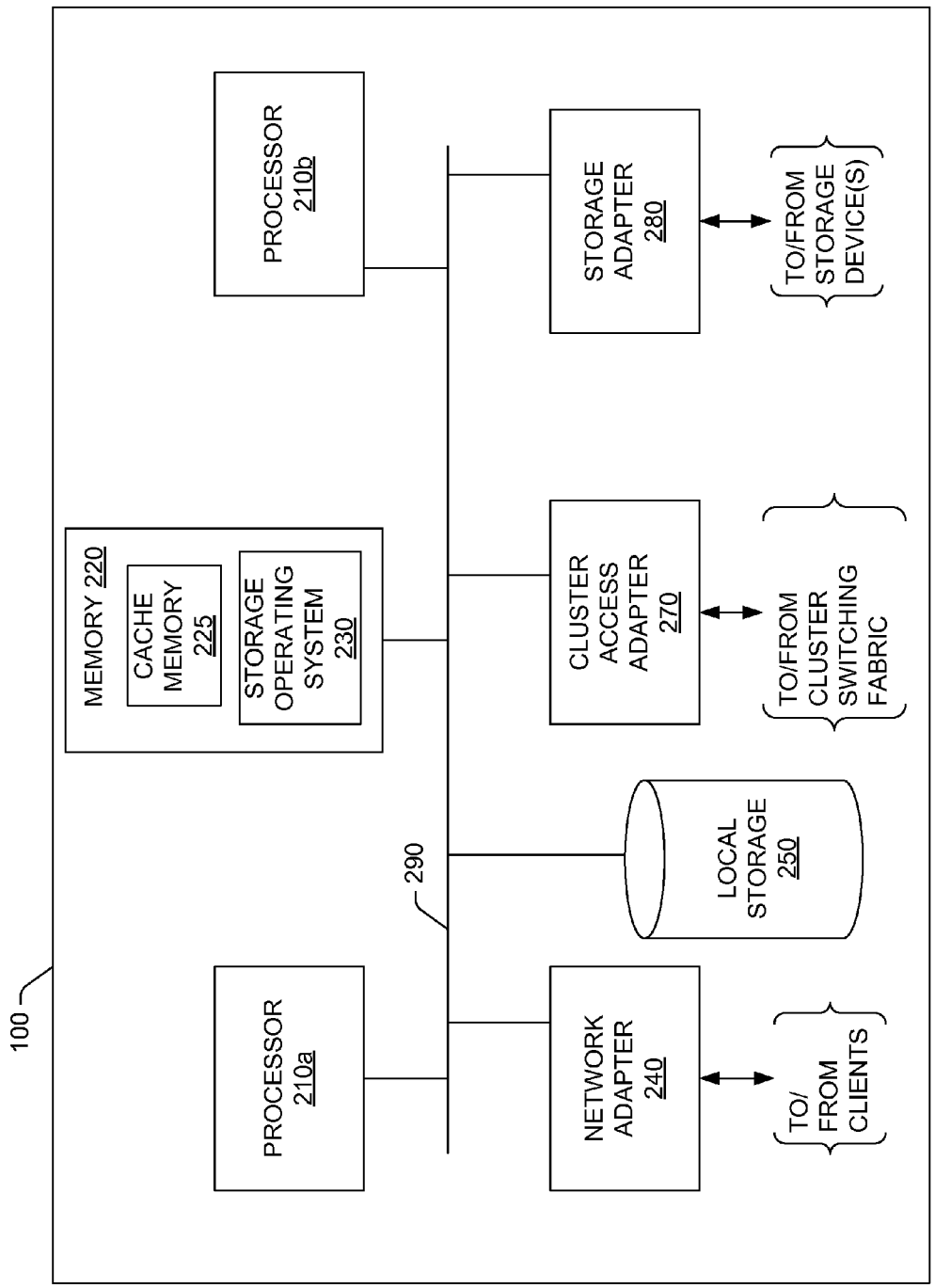
FIG. 2 is a diagram illustrating various components of a node of the cluster shown in FIG. 1.

FIG. 2 is a diagram illustrating an example of a node 100 in more detail. In an exemplary embodiment, the node 100 is a storage server that includes a plurality of processors 210*a*, 210*b*, a memory 220, a network adapter 240, a cluster access adapter 270, a storage adapter 280 and local storage 250, all interconnected by an interconnect 290. The local storage 250 includes one or more storage devices, such as disks, utilized by the node 100 to locally store configuration information provided by one or more management processes that execute as user mode applications. The cluster access adapter 270 includes a plurality of ports adapted to couple the node 100 to other nodes 100 of the cluster. In the illustrated embodiment, Ethernet is used as the clustering protocol and interconnect media, although other types of protocols and interconnects may be utilized within the cluster architecture described herein. In alternative embodiments where the N-blades and D-blades are implemented on separate storage servers or computers, the cluster access adapter 270 is utilized by the N-blade 160 and/or D-blade 170 for communicating with other N-blades and/or D-blades of the cluster.

Each node 100 can be embodied as a dual processor storage server executing a storage operating system 230 that preferably implements a high-level module, such as a storage manager, to logically organize the information as a hierarchical structure of named directories, files and special types of data containers called virtual disks (hereinafter generally "blocks") on the disks. Note, however, that the node 100 can alternatively comprise a single processor or more than two processor system. Illustratively, one processor 210*a* can execute the functions of the N-blade 160 on the node 100 while the other processor 210*b* executes the functions of the D-blade 170.

The memory 220 illustratively comprises storage locations that are addressable by the processors and adapters for storing software program code and data structures associated with the present invention. The node also includes a cache memory 225 configured to store various attributes for data containers. In the illustrative embodiment, a data container is represented in the write-anywhere file system as an inode data structure adapted for storage on storage devices 150. The processor and adapters may, in turn, comprise processing elements and/or logic circuitry configured to execute the software code and manipulate the data structures. The storage operating system 230, portions of which is typically resident in memory and executed by the processing elements, functionally organizes the node 100 by, inter alia, invoking storage operations in support of the storage service provided by the node 100. It will be apparent to those skilled in the art that other processing and memory implementations, including various computer readable storage media, may be used for storing and executing program instructions pertaining to the technique introduced here.

According to embodiments described herein, cache memory 225 is populated with individual components of a directory path. The cache memory 225 can be a dedicated portion of the memory 220 or a separate memory for preferably persistent or non-volatile storage. In other implementations, the cache memory can be implemented on storage devices. The cache memory is populated with the individual components as a result of the directory path traversal technique performed by a path traversal engine (such engine 335 shown in FIG. 3). The cached entries include, in one implementation, an identifier of a data container or directory that triggered the traversal procedure and a pointer to an inode number of the parent of the data container or the directory. Exemplary entries in the cache memory 225 are shown in FIG. 10. The cached entries are used by the path traversal engine to construct a directory path to a data container or to directory.

Still continuing with the description of the storage server node, the network adapter 240 includes a plurality of ports to couple the node 100 to one or more clients 110 over point-to-point links, wide area networks, virtual private networks implemented over a public network (Internet) or a shared local area network. The network adapter 240 thus can include the mechanical, electrical and signaling circuitry needed to connect the node 100 to the network of the connection system 120. Illustratively, the connection system 120 can be embodied as an Ethernet network or a Fibre Channel (FC) network. Each client 110 can communicate with the node 100 over the connection system 120 by exchanging discrete frames or packets of data according to pre-defined protocols, such as TCP/IP.

The storage adapter 280 cooperates with the storage operating system 230 executing on the node 100 to access information requested by the clients 110. The information may be stored on any type of attached array of writable storage media, such as magnetic disk or tape, optical disk (e.g., CD-ROM or DVD), flash memory, solid-state disk (SSD), electronic random access memory (RAM), micro-electro mechanical and/or any other similar media adapted to store information, including data and parity information. The storage adapter 280 includes a plurality of ports having input/output (I/O) interface circuitry that couples to the storage devices 150 over an I/O interconnect arrangement, such as a conventional high-performance, Fibre Channel (FC) link topology.

Storage of information on each storage device 150 can be implemented as one or more storage volumes that include a collection of physical storage devices 150 cooperating to define an overall logical arrangement of volume block number (VBN) space on the volume(s). A "volume", as the term is used herein, is a logical container of data which is an abstraction of physical storage, combining one or more physical mass storage devices (e.g., disks) or parts thereof into a single logical storage object, and which is managed as a single administrative unit, such as a single file system. Each volume is generally, although not necessarily, associated with its own file system. A "file system", as the term is used herein, is a structured set of stored logical containers of data, such as blocks, files, logical unit numbers (LUNs), directories and/or other data containers. Note, however that a "file system", as the term is used herein, does not necessarily store data in terms of "files" per se. For example, a file system can implement block based storage, where a "block" is defined herein as the smallest addressable unit of contiguous data used by a given file system to manipulate and transfer data, commonly (though not necessarily) 4 Kbytes in size.

The storage devices within a volume are typically organized as one or more RAID groups. Most RAID implementations, such as RAID-4, enhance the reliability of data storage through the redundant writing of data "stripes" across a given number of physical storage devices in the RAID group, and the appropriate storing of parity information with respect to the striped data. RAID-4 is an illustrative example of a RAID implementation, although other types and levels of RAID implementations can be used in accordance with the principles described herein. It should also be appreciated that RAID data "stripes" are different from the striping of across volumes, described further below.

The storage operating system 230 facilitates clients' access to data stored on the storage devices 150. In certain embodiments, the storage operating system 230 implements a write-anywhere file system that cooperates with one or more virtualization modules to "virtualize" the storage space provided by storage devices 150. In certain embodiments, a storage manager 360 (shown in FIG. 3) logically organizes the information as a hierarchical structure of named directories and files on the disks 150. Each "on-disk" data container may be implemented as set of disk blocks configured to store information, such as data, whereas the directory may be implemented as a specially formatted file in which names and links to other files and directories are stored. In the illustrative embodiment, the storage operating system 230 is a version of the Data ONTAP® operating system available from NetApp®, Inc. of Sunnyvale, Calif. and the storage manager 360 implements the Write Anywhere File Layout (WAFL®) file system from NetApp®, Inc. However, other storage operating systems are capable of being enhanced for use in accordance with the principles described herein.

Figure 3:
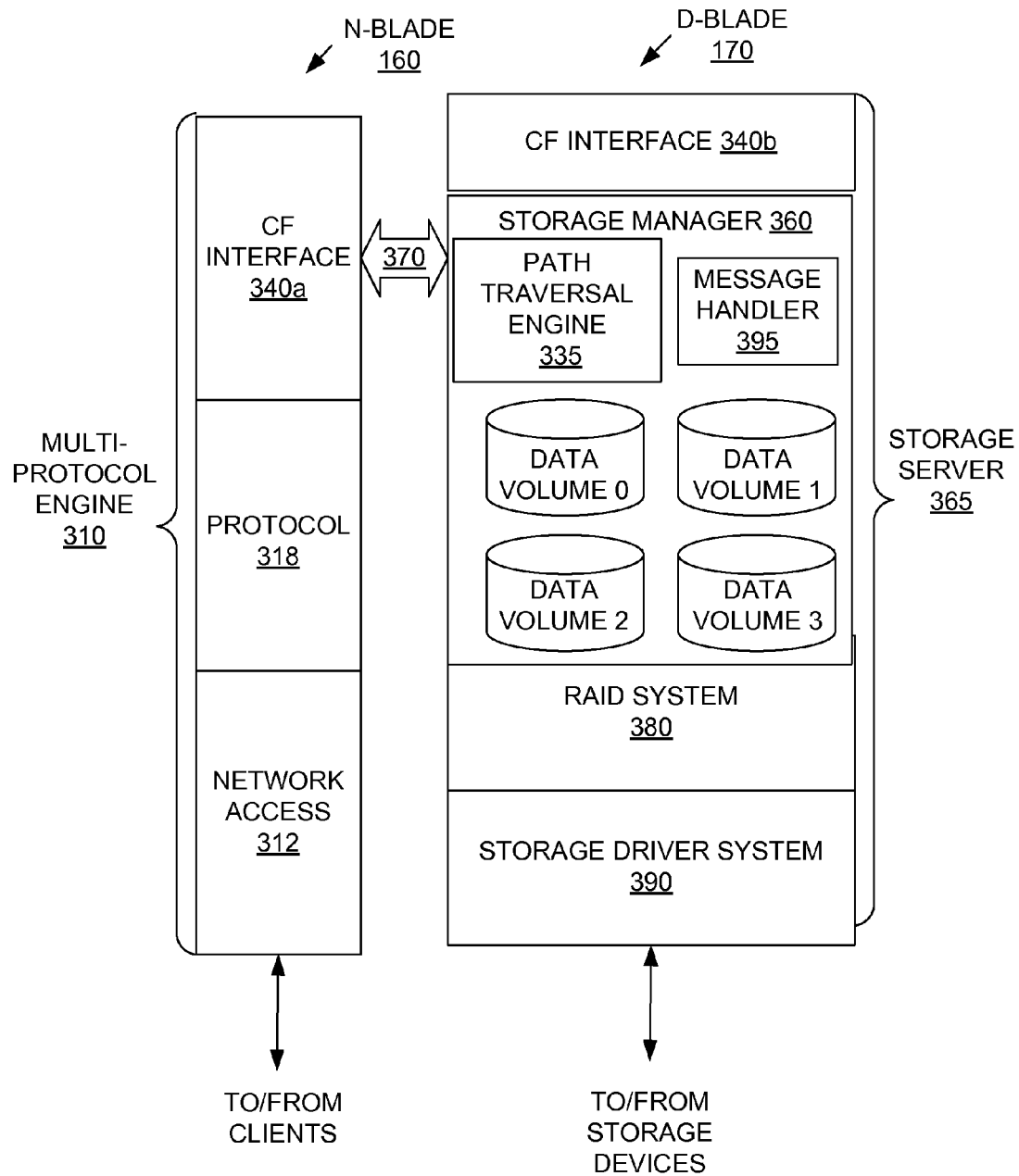
FIG. 3 is a diagram illustrating a storage operating system executed on a node shown in FIG. 1.

FIG. 3 is a diagram illustrating an example of storage operating system 230 that can be used with the technique introduced here. As used in this disclosure, the term "component", "module", "system", "engine" and the like are intended to refer to a computer-related entity, either software-executing general purpose processor, hardware, firmware, or a combination thereof.

In the illustrated embodiment, the storage operating system 230 includes multiple functional layers organized to form an integrated network protocol stack or, more generally, a multi-protocol engine 310 that provides data paths for clients to access information stored on the node using block and file access protocols. The multiprotocol engine 310 also forms the N-blade 160 in combination with underlying processing hardware. The multi-protocol engine includes a network access layer 312 which includes one or more network drivers that implement one or more lower-level protocols to enable the processing system to communicate over the connection system 120, such as Ethernet, Internet Protocol (IP), Transport Control Protocol/Internet Protocol (TCP/IP), (FCP) and/or User Datagram Protocol/Internet Protocol (UDP/IP). The multiprotocol engine 310 also includes a protocol layer which implements various higher-level network protocols, such as Network File System (NFS), Common Internet File System (CIFS), Hypertext Transfer Protocol (HTTP), Internet small computer system interface (iSCSI), etc. Further, the multi-protocol engine 310 includes a cluster fabric (CF) interface module 340a which implements intra-cluster communication with D-blades and with other N-blades.

In addition, the storage operating system 230 includes a set of layers organized to form a storage server 365 that provides data paths for accessing information stored on the storage devices 150 of the node 100. The storage server 365 also forms the D-blade 170 in combination with underlying processing hardware. To that end, the storage server 365 includes the storage manager module 360 that organizes any number of volumes, such as volume-1, volume-2, . . . , volume-N, a RAID system module 380 and a storage driver system module 390. The storage manager 360 can implement a plurality of volumes as a striped volume set (SVS). As indicated earlier in the document, data containers can be striped among a plurality of volumes in the SVS (often services by different nodes (D-blades)) so that differing portions of the data container can be stored at different volumes. Furthermore, according to the environment in which the inventive techniques are implemented, directory entries are striped among volumes. To stripe a directory, some of the directory's data container identifier-to-inode-number mappings are stored on one volume while other entries are stored on another volume.

The storage server 365 also includes a CF interface module 340b to implement intra-cluster communication with N-blades and other D-blades. The CF interface modules 340a and 340b can cooperate to provide a single file system image across all D-blades 170 in the cluster. Thus, any network port of an N-blade 160 that receives a client request can access any data container within the single file system image located on any D-blade 170 of the cluster.

Figure 8:
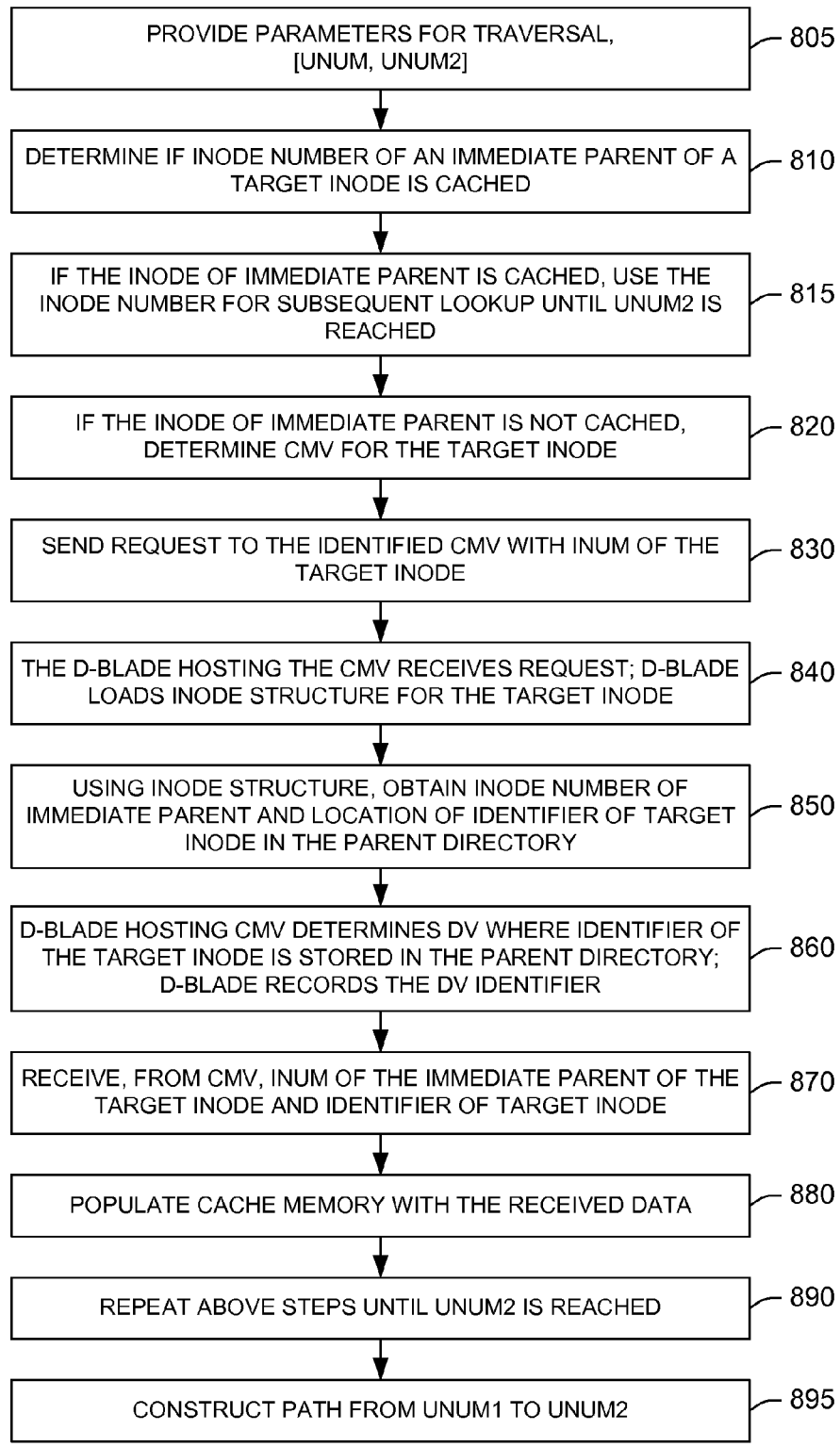
FIG. 8 is a flowchart representation of an overall process of creating entries in a cache memory storing path components according to one embodiment.

The storage server 365 further executes the path traversal engine 335 configured to perform traversal of a hierarchical directory structure and to cache individual path components on a storage server node, as described in more detail in reference to FIG. 8. Briefly, path traversal engine 335 iteratively traverses the hierarchical directory structure from a target inode to a specific parent in the directory structure to determine an identifier of the target inode and an inode number of its immediate parent. As used herein, the term "immediate parent of an inode" means a parent that is directly above the inode in the hierarchical directory structure. The cache memory of a storage server node where the target inode resides is populated with these data, which are later used to construct a directory path from the target inode to the specific parent without sending requests to other storage server nodes. The storage server 365 also executes a message handler 395, which is adapted to load an inode structure (e.g., inode structure 502 shown in FIG. 5).

The CF interface module 340 implements the CF protocol to communicate file system commands among the blades of cluster. Such communication can be effected by a D-blade exposing the CF API to which an N-blade (or another D-blade) issues calls. To that end, the CF interface module 340 can be organized as a CF encoder/decoder. The CF encoder of, e.g., CF interface 340a on N-blade 160 can encapsulate a CF message as (i) a local procedure call (LPC) when communicating a file system command to a D-blade 170 residing on the same node 100 or (ii) a remote procedure call (RPC) when communicating the command to a D-blade residing on a remote node of the cluster. In either case, the CF decoder of CF interface 340b on D-blade 350 de-encapsulates the CF message and processes the file system command.

In operation of a node 100, a request from a client 110 is forwarded as a packet over the connection system 120 and onto the node 100, where it is received at the network adapter 240 (FIG. 2). A network driver of layer 312 processes the packet and, if appropriate, passes it on to a network protocol and file access layer for additional processing prior to forwarding to the storage manager 360. At that point, the storage manager 360 generates operations to load (retrieve) the requested data from the storage device 150 if it is not resident in memory 220. If the information is not in memory 220, the storage manager 360 obtains a logical VBN. The storage manager 360 then passes a message structure including the logical VBN to the RAID system 380; the logical VBN is mapped to a disk identifier and disk block number (DBN) and sent to an appropriate driver (e.g., SCSI) of the storage driver system 390. The storage driver accesses the DBN from the specified storage device 150 and loads the requested data block(s) in memory for processing by the node. Upon completion of the request, the node (and operating system) returns a reply to the client 110 over the connection system 120.

In the illustrative embodiment, a data container is represented in the write-anywhere file system as an inode data structure adapted for storage on storage devices 150. FIG. 5 is a schematic block diagram of an inode structure 502, which preferably includes a metadata section 503 and a data section 550. The metadata section 503 includes various fields for storing attributes of a data container, such as a type 510, a size 515, a time stamp 520, a generation number 533, and a metadata invalidation flag field 534, indicating whether metadata in the inode data structure is valid. Metadata section further includes a striping epoch for storing striping rules. According to techniques described herein, the metadata section may further include an inode to path cookie field 555. In one implementation, field 555 stores the following information: inode number of the parent directory (INUM) 556, volume index 557, entry index in the parent directory 559. The parent directory INUM provides a pointer to a child, such as a data container or a directory. The entry index points to an entry within a parent directory. The volume index 557 indicates where in the striped volume set the identifier of the data container is stored. This information is utilized by embodiments further described herein in order to identify a parent of an inode associated with a data container, an identifier of the inode, and a volume where the identifier of the data container is stored. Those skilled in the art would understand that the metadata section of the inode structure can store other attributes, which can be used to identify where the identifier of the data container is stored.

The data section 550 of an inode may include file system data or pointers, the latter referencing 4 kB data blocks on a storage device used to store the file system data.

Hierarchical Directory Structure

A typical file system may contain thousands (or even hundreds of thousands) of directories. Related data containers are stored in the same directory. A directory contained inside another directory is called a subdirectory. For efficient data processing of a hierarchical data structure, it can be represented as a tree having a plurality of directories, subdirectories and data containers. A data container, a directory, or a subdirectory within a directory structure has zero or more children. A data container, a directory, or a subdirectory typically has at most one parent, except for the root, which does not have a parent. A parent is associated with one or more links, which point to its children. These links indicate a logical association between the parents and children in the hierarchical system.

A directory in a directory structure represents an array storing mappings between an identifier of a subdirectory or a data container within the directory and a corresponding inode number. The inode, indexed by the inode number, describes metadata attributes of the data container in the inode data structure (as illustrated in reference to FIG. 5). An inode number refers to an index of an inode data structure. Typically, entries within a directory are updated by the D-blade when the D-blade receives a request to create a data container, to delete a data container or to rename a data container. In one implementation, directory entries can be stored at a storage device, such as device 150 shown in FIG. 1, on each node in a cluster of nodes.

Striping of Data Containers

Figure 4A:
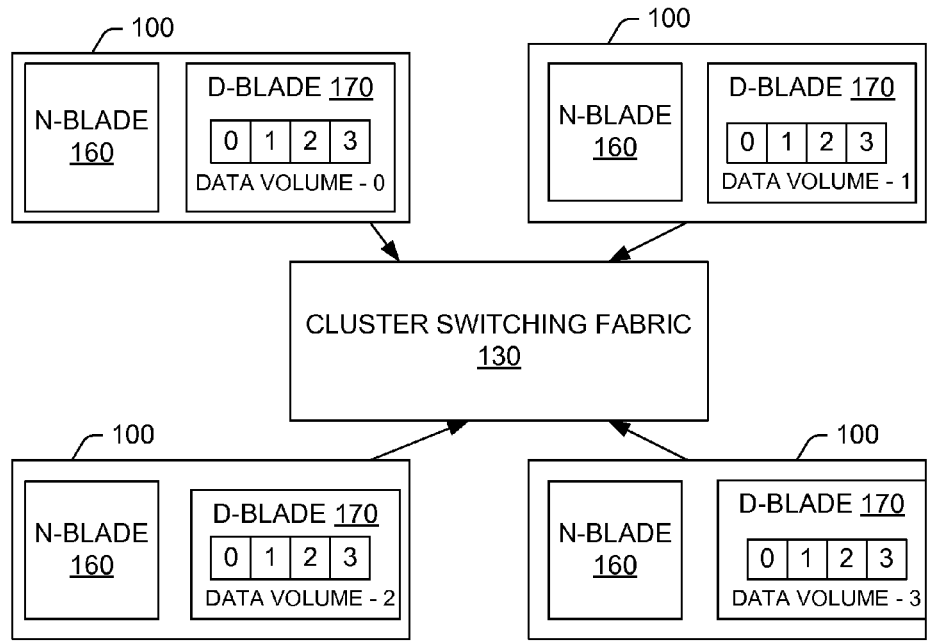
FIG. 4A is a diagram illustrating the allocation of data distributed among a plurality of volumes of a storage server architecture.

FIG. 4A illustrates an example of striping of data containers across a plurality of volumes of a storage server according to a striped file system. Within a clustered computing environment, any number of volumes of varying lengths can be implemented by the embodiments described herein for striping data. Specifically, although FIG. 4A shows only one volume allocated to each node 100, any number of volumes can be allocated per node 100.

The nodes 100 communicate with one another via the cluster switching fabric 130. Specifically, the N/D-blades of the nodes 100 communicate as described above. Each D-blade 170 includes a volume, such that each volume can store striped data. For example, as illustrated by FIG. 4B, data volume-0 (DV-0) can store a stripe of data at a first location, data volume-1 (DV-1) can store a stripe of data at a second location, data volume-2 (DV-2) can store a stripe of data at a third location, and data volume (DV-3) can store a stripe of data at a fourth location.

Figure 4B:
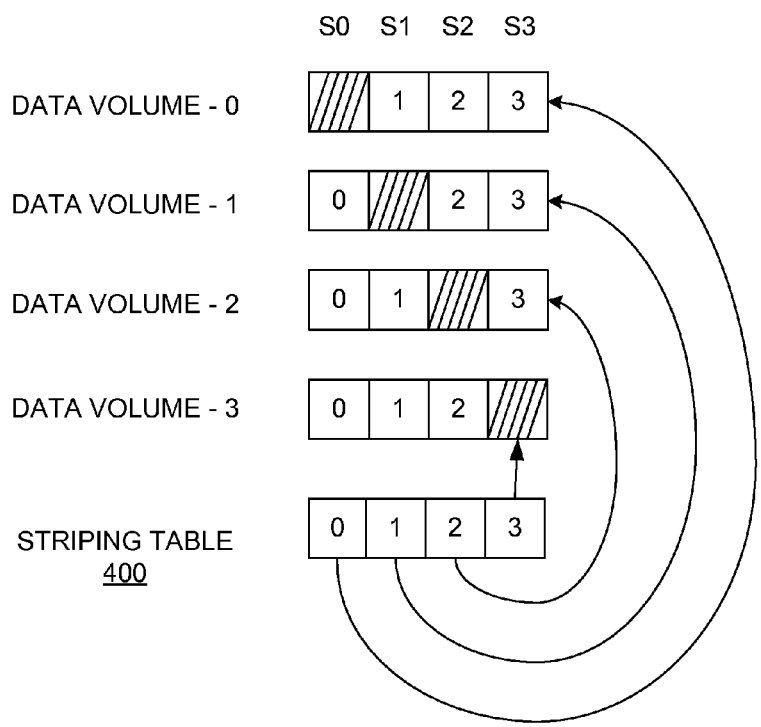
FIG. 4B is a diagram illustrating an example of a striping table, corresponding to the example of FIG. 4A.

FIG. 4B shows an example of a striping table 400 associated with the striping example of FIG. 4A and stored in memory 220. The striping table 400 is a data allocation structure that describes the distribution of the stripes (chunks) of data among the volumes. In the illustrated example, each logical container of data is divided into four stripes, designated S0, S1, S2 and S3 in striping table 400. Thus, the striping table 400 illustrates that the first stripe S0 of a given logical container of data is located on DV-0, the second stripe S1 of the logical container of data is located on DV-0 at a third location on DV-1, the third stripe S2 of the logical container of data is located on DV-2, and the fourth stripe S3 of the logical container of data is located on DV-3 The SVS is associated with a set of striping rules that define a striping algorithm, a stripe width and an ordered list of volumes within the SVS. The striping rules for each SVS are stored as an entry in a database (not shown in Figures). An exemplary entry in the database may include a SVS ID field and one or more sets of striping rules. In alternate embodiments additional fields may be included. The SVS ID field contains the ID of a SVS which, in operation, is specified in a data container handle. The striping rules contain information for identifying the organization of a SVS. For example, the stripe algorithm ID field identifies a striping algorithm used with the SVS. Since multiple striping algorithms could be used with a SVS; accordingly, stripe algorithm ID is needed to identify which particular algorithm is utilized. Each striping algorithm, in turn, specifies the manner in which directory entries are striped across the plurality of volumes of the SVS.

Striping of Directory Entries

Figure 6:
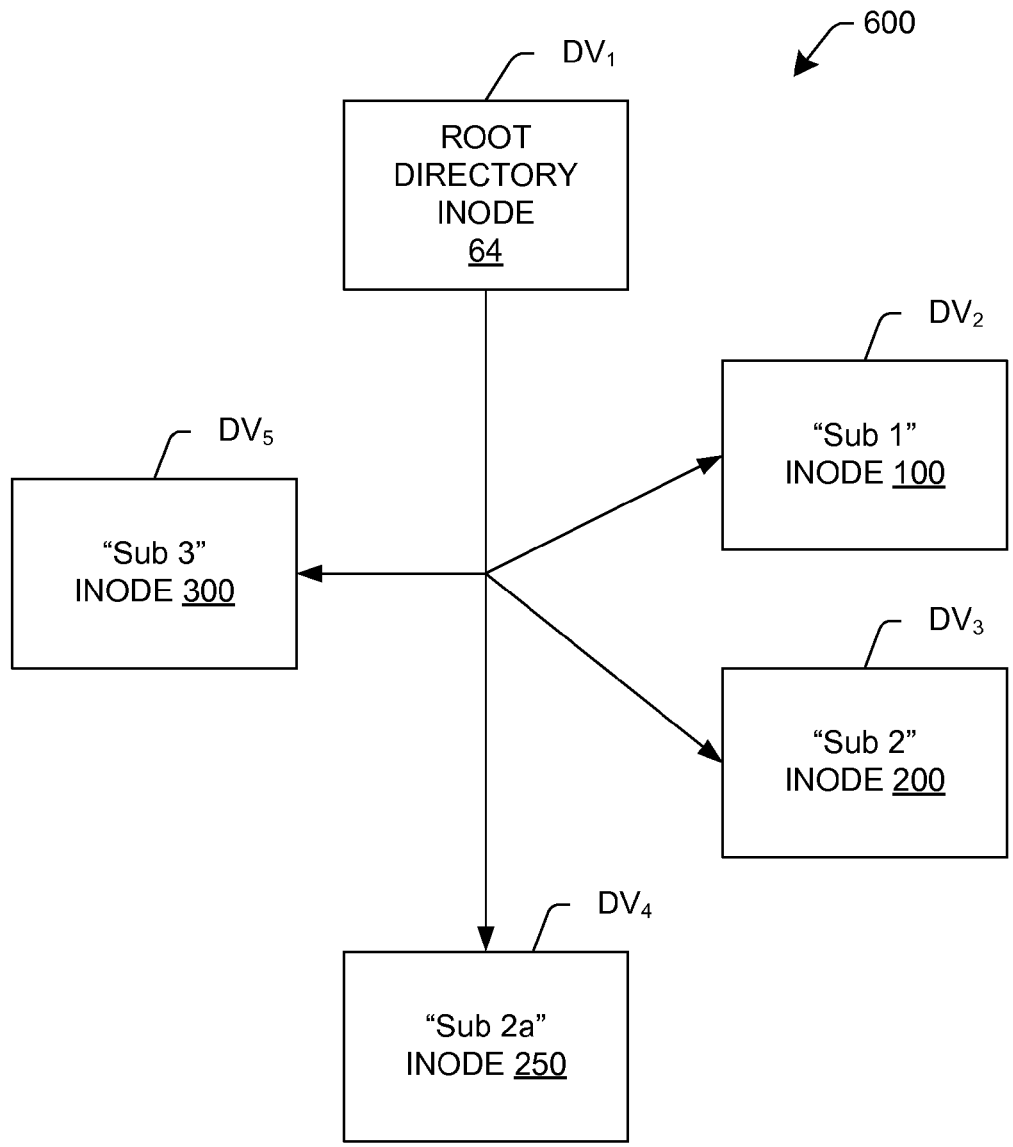
FIG. 6 is a diagram of a striped volume set for storing data containers and directories.

FIG. 6 is a block diagram of the striped volume set (SVS) 600 consisting of data volume 1 (DV1), DV2, DV3, DV4, and DV5. Those skilled in the art would understand that five volumes are shown for illustrative purposes only and that the teachings of the present invention may be utilized with SVSs having any number of volumes. This diagram illustrates how various components of a directory path can be stored in the striped volume set in the clustered storage server. Each DV in the striped volume set 600 serves as a container metadata volume (CMV) for any data container stored therein.

The following example illustrates how exemplary path components (or directory entries) of a directory structure can be striped across volumes. An exemplary hierarchical directory structure may have a "path" as a root directory. Path has a child, directory "sub1", which in turn has two children, subdirectories "sub2" and "sub2a". Sub2, in turn, may have two children, subdirectories "sub3" and "sub3a". Sub3, in turn, has a data container "hello.txt". FIG. 7 illustrates entries stored in the directory sub1 having INUM 100. Each entry may include a directory or data container identifier to inode number mapping. Sub 1 stores mappings for its children sub2 and sub2a. Sub2 stores mappings for its children sub3 and sub3a (not shown in FIG. 7). It should be noted that the entries within Sub1 in FIG. 7 are not striped. As described herein, directory entries can be striped among various volumes in the cluster. In one implementation, the decision as to which volume should store a particular data container identifier is based on a hash value of the data container identifier. The mechanism of striping of directories is described in more detail in a pending patent application Ser. No. 11/970,452 assigned to NetApp, Inc., entitled "Striping Directories Across a Striped Volume Set by the Filenames Contained in the Directories", by Richard P. Jernigan IV and Robert W. Hyer, Jr.

FIG. 6 illustrates how mappings stored within sub1 and sub2 can be striped across DV2, DV3, DV4, and DV5.

DV1 holds part of the root directory "path" and its inode number INUM 64.

DV2, holds part of the directory, i.e., "sub1" and its inode number, UNUM, 100 DV2 is a CMV of inode 100.

DV3 holds part of sub1 directory, i.e., "sub2" and its inode number, UNUM, 200. DV3 is the CMV of inode 200.

DV4 holds part of sub1 directory, "sub2a" and its INUM 250. DV4 is the CMV of inode 250.

DV5 holds part of sub2 directory, "sub3" and its INUM 300. DV5 is the CMV of inode 300.

To construct a path to access a data container, such as "hello.txt" within sub3, identifier-to-inode mappings distributed across multiple volumes need to be obtained, such as mappings between sub1 and its inode number, sub2 and its inode number, sub3 and its inode number. As a result, a storage server node may need to communicate with more than one other node to construct a path. In the illustrated example, if "sub2" is renamed to "sub2_renamed", such a change needs to be communicated to an application registered to receive the updates about sub2. Since the intermediate component, "sub2", is changed to "sub2_renamed", the new path component needs to be reported. Later, if a data container XYZ2 is created, the newly reported path of a created data container would be /sub1/sub2_renamed/sub3/XYZ2. Since the components of the path of data container "XYZ2" may be stored at different volumes, a node may need to communicate with more than one node to obtain the new path. The increased inter-node communication may significantly impact the cluster system performance.

Distributed (Node to Path Traversal

According to embodiments described herein, rather than repeatedly consulting differing storage server nodes which store directory entries needed to construct a directory path, an efficient caching mechanism is provided so that individual path components, such as identifier-to-inode number mappings for a path component, are cached at a storage server node that stores an inode for which directory path needs to be constructed. Caching individual components of a directory path is efficient so that next time the path is requested or any component of the path is needed, the previously cached components can be used to construct a path. An exemplary cached entry in the cache memory may include an identifier of the target inode for which directory path needs to be constructed and an inode number of an immediate parent.

With reference to FIG. 8, a flow chart is provided describing the steps performed by the path traversal engine 335 of the node for which a directory path needs to be constructed to perform efficient caching of individual components of a directory path. In one implementation, the path traversal procedure is initiated when a data container or a directory in a hierarchical directory structure is modified and an application registered to receive notifications about such a modification needs be notified. For example, any change in a directory, such as creation of a data container, deletion of the data container, or renaming of a data container triggers an event to be communicated to the application (e.g., 105). In other implementations, the path traversal procedure can be initiated when a path from a target inode to a specified parent needs to be constructed and is not triggered by a registered application.

Initially, at step 805, the traversal procedure executed by engine 335 specifies parameters of the traversal of the hierarchical directory structure. In one implementation, the parameters of the traversal can be an inode number (INUM) of the target inode as a starting point of the traversal and an inode number INUM 2 of a specified parent. The "target inode", as used herein, is an inode of a data container that initiates the traversal (e.g., because it has undergone a change, such as a name change, or because the path from the target inode up to a specific parent is requested). INUM 2 could be a parent, such as a root directory, or immediate parent of the target inode, or any intermediate parent between the INUM and the root directory. In one implementation, the INUM 2 can be provided by the application registered for notification services with the node. The traversal procedure described herein is executed iteratively until the INUM2 is reached.

Once the parameters of the inode to path traversal are specified, engine 335 consults the cache memory (e.g., 225) to determine if the immediate parent of the target inode is already cached at the memory (step 810). The path traversal engine consults the cache memory using, for example, the following set of keys [VOLUME INDEX, INUM], wherein VOLUME INDEX is a master volume ID where the target inode resides and INUM is the inode number of the target inode. In this description, master volume ID (MSID) and volume index are used interchangeably.

If the immediate parent of INUM of the target inode is cached in the cache memory 225, the parent INUM is used for subsequent lookup until the traversal reaches UNUM2 (step 815).

If the immediate parent of INUM of the target inode is not cached in the cache memory 225, path traversal engine 335 prepares a GET METADATA message requesting an identifier of the inode having the INUM. The request is sent to the storage server node that hosts the container metadata volume (CMV) for the target inode INUM (step 820). As described herein, the CMV stores metadata describing the inode. According to one illustrative implementation, to determine which volume is the CMV for the target inode, engine 335 converts an identifier (such as a name) of the target data container (e.g., "hello.txt") into a volume index using striping rules stored on the D-Blade, e.g., 170. The striping rules provide methodology for striping directory entries across the volumes in the striped volume set in cluster. In one implementation the identifier is converted into a numerical string so that each character is mapped into a unique bit string. Those skilled in the art would understand that other mechanisms can be used to convert an identifier into a volume index. The numerical string can be further optionally hashed into a shorter bit string. The shorter bit string is mapped into a volume identifier. The resulting value uniquely identifies one of the volumes on which the identifier of the target inode is stored.

Upon identifying the CMV for the target inode, engine 335 sends the request for obtaining metadata (such as the inode number of the parent directory of the target inode) to the node hosting the CMV for the target inode. The request includes the INUM of the target inode (step 830). Those skilled in the art would understand that the storage server node that received the request to provide a path for the path component having the target inode might be the CMV for the target inode.

Upon receiving the request by the node hosting the CMV for the target inode, the message handler 395 component of the D-Blade loads the inode into the memory using the INUM of the target inode (step 840). An exemplary inode structure was described in reference with FIG. 5. The inode structure may include a metadata section and a data section. In one implementation, the metadata section includes the inode to path cookie field 555. The inode to path cookie field provides location (such as an index) of the identifier of the target inode inside the parent directory that stores mappings between inode numbers and identifiers of data containers. In addition, the cookie may include the volume index, which is a number within a striped volume indicating the volume or DV where the identifier of the data container resides. Thus, the node hosting the CMV stores identifier of the data container having the target INUM and the INUM of the parent directory. Since the directory entry that includes the identifier of the target INUM could reside in a different node, the lookup request to other nodes might be needed to obtain the requisite entry.

Figure 9:
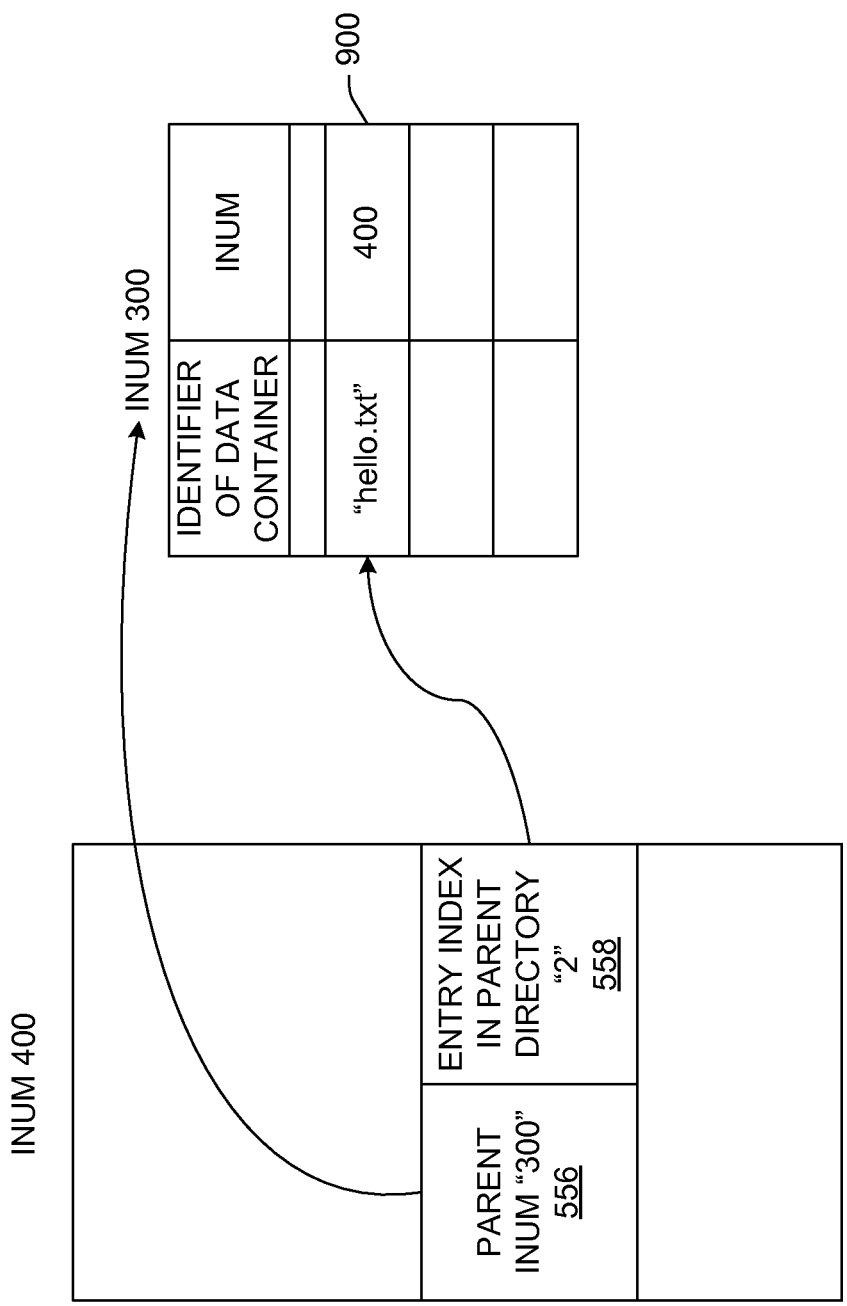
FIG. 9 is a diagram illustrating an exemplary inode pointing to an entry in a directory.

Now with reference to FIG. 9, it illustrates the inode structure for the target inode having an exemplary INUM 400 and a pointer from the inode structure to an entry in the parent directory having INUM 300. As shown in FIG. 9, inode structure for the target inode INUM 400 includes an inode to path cookie field storing INUM of the parent "300" and an index pointing to an entry in the parent directory having INUM 300 (step 850). Inode structure may additionally include the volume index (not shown in FIG. 9), which is a number within a striped volume indicating the volume or DV where the identifier of the data container resides. In the directory inode 300, entry 900 includes the identifier (i.e., a name) "hello.txt" and its associated inode number (INUM) 400. Since the entry having the identifier, such as a name, of the target inode and its associated INUM could be stored at any node in the cluster system, to obtain a mapping between the identifier and the inode, the remote procedure call might need to be issued to other nodes. The volume index can be used to find the DV that stores the requisite directory entry. In one implementation, using the inode to path cookie, the message handler 395 of the node hosting the CMV for the target inode decodes the cookie to obtain the volume index. The message handler 395 consults the striping rules at the D-Blade to identify the volume ID storing the identifier of the target inode (step 860). The striping rules indicate how directory mappings are striped amongst the volumes. The striping rules in one implementation may be stored in a database maintained by D-Blade (not shown in Figures). Once the volume index is determined, the message handler 395 then sends the request to the node hosting the DV with the determined volume index. Those skilled in the art would understand that the directory mapping for the target inode may reside on the node hosting the CMV for the target inode.

Figure 13:
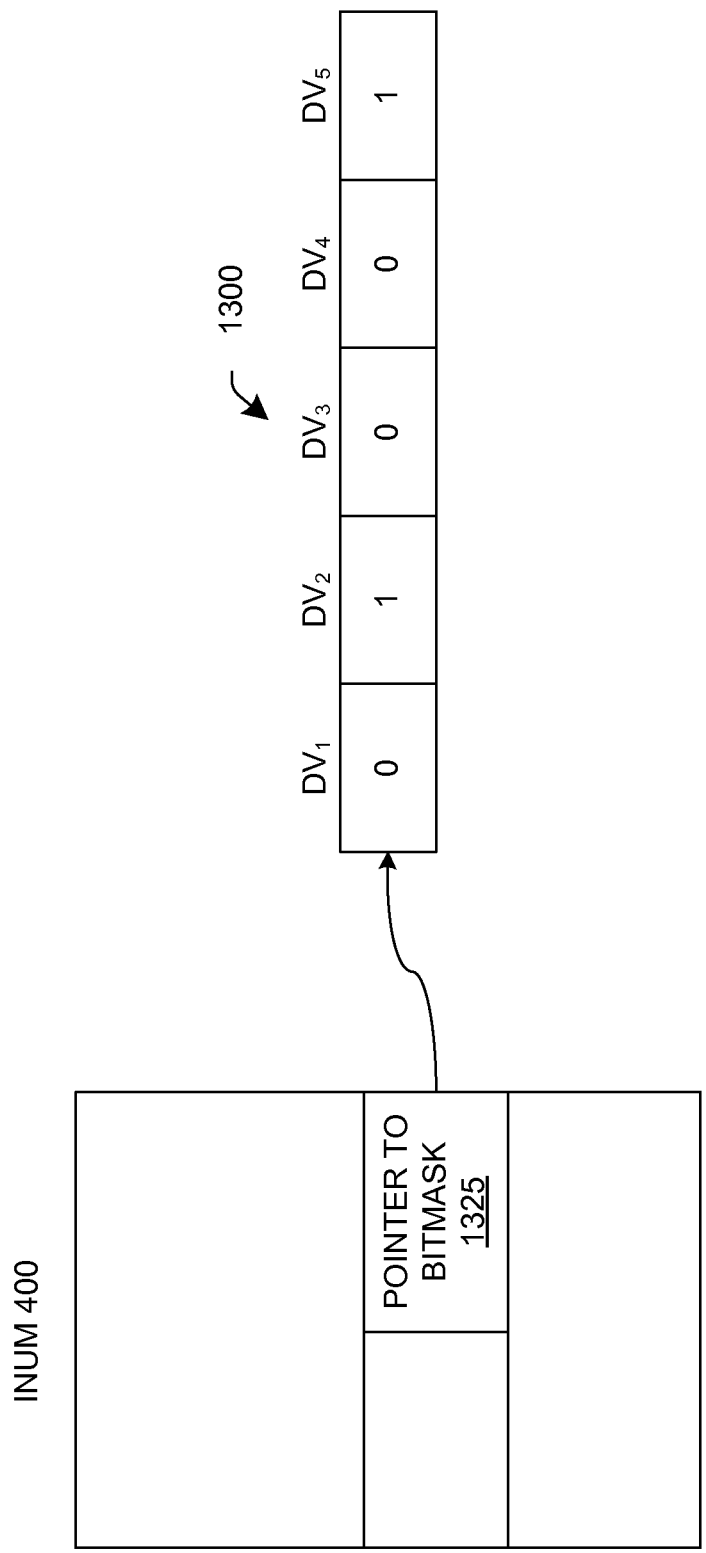
FIG. 13 is a diagram illustrating an inode pointing to a cache memory bitmask indicating which Data Volume (DV) caches metadata for a data container.

At step 870, the storage server node hosting the DV that stores identifier of the target inode provides, to the node hosting the CMV, the identifier of the target inode and INUM of the immediate parent. The message handler 395 of the node hosting the CMV receives the response and records the volume index. In one implementation, the message handler 395 may use a bitmask to indicate which DV caches the mapping between a data container identifier and its inode. Such an exemplary bitmask is shown in FIG. 13. INUM 400 illustrated in FIG. 13 points (using pointer 1325) to the bitmask 1300, which includes a mask for each DV in the striped volume set, such as DV1, DV2, DV3, DV4, and DV5. Those skilled in the art would understand that five DVs are shown for exemplary purposes only. In one implementation, the bit in the bitmask is marked as "1" corresponding to a DV that caches metadata for a data container. In alternative implementation, another value can be used to provide such an indication.

Still with reference to step 870, the storage server node that initiated the traversal procedure receives, in one implementation, the following data: identifier (such as a name) of the target inode in the parent directory and inode number (INUM) of the immediate parent directory of the target inode.

Thus, to continue with the illustrated example in which the target inode number is INUM=400, the storage server node receives the following information: INUM of the immediate parent directory, 300, and identifier of the target inode, "hello.txt". The path traversal engine populates the cache memory 225 with the received information. The created entry, in one implementation, includes the following data: {the volume index where the target data container resides, INUM of the target inode, Parent INUM, and Identifier of the target inode in the Parent Directory}.

The path traversal engine iteratively repeats the procedure (step 890) until it reaches INUM2, which could be the root of the file system or any other inode specified by the path traversal engine 335. For example, on a next iteration, the path traversal engine uses the inode number of the immediate parent as the target inode until it reaches the INUM2. When the INUM2 is reached, the cache memory is populated with the entries corresponding to the parent directories for the target inode. Each such entry includes, for example, INUM of the target inode, INUM of the immediate parent, as well as an identifier of the INUM within the parent directory. Exemplary cached entries are shown in FIG. 10. Each entry is associated with a path component, such as a data container or a directory. In the illustrated example, an entry is indexed by VOLUME INDEX and INUM of the target inode and points to Parent INUM (the inode number of the immediate parent of the target inode) and the identifier of the path component in the parent directory. Those skilled in the art would understand that an entry in the cache associated with a path component is not limited to these fields and that other data essential for constructing a directory path in the hierarchical directory structure can be used. Advantageously, during the iterative path traversal process, if the immediate parent of the target inode is cached, then the cached entry is used to determine the identifier of the target inode in the parent directory, thereby eliminating the need to perform a remote procedure call to other nodes to obtain the immediate parent of the target inode. Thus, although initially inter-node communication is utilized to populate the cache memory with directory entries, subsequent requests for the cached component reduce the need to request the path component from other storage server nodes.

At step 895, path traversal engine uses the entries in the cache memory to construct a path from the path component having inode number INUM to the path component having inode number INUM 2. For example, if in the illustrative example INUM=400 and INUM2=64, then the constructed path including all the intermediate components is as follows: path/sub1/sub2/sub3/hello.txt.

The constructed path can be provided to the application, e.g., 105, which has registered with the D-Blade to receive updates with respect to a list of directories and/or data containers. Importantly, once the cache is populated with the entries, subsequent queries to obtain a directory path when a data container has been deleted, created, or renamed reduce the need to issue remote procedure calls to other nodes since cached entries corresponding to unmodified directory components are retained in the cache memory and can be provided to an application. The cached components can be used to construct a new directory path, thereby reducing inter-node communication to obtain the components from other nodes. As an example, to construct a path having five individually cached components where one component was modified, only one remote procedure call is needed to obtain the modified component instead of performing five remote procedure calls. For example, using the previously described example, the cache memory stores the following entries:

1. 400 maps to {300, hello.txt}
2. 300 maps to {200, sub3}
3. 200 maps to {100, sub2}
4. 100 maps to {64, sub1}

If sub2 is renamed to "sub2_renamed", then a single invalidation of the entry {100, sub2} allows the system to retain the other three entries such that to restore the full path, the only query to obtain identifier of the modified component "sub2_renamed" is needed. A less organized cache memory, such as the one that stores the entire path rather than individual path components, would require explicitly invalidating every component in the cache.

Cache Invalidation

Figure 11:
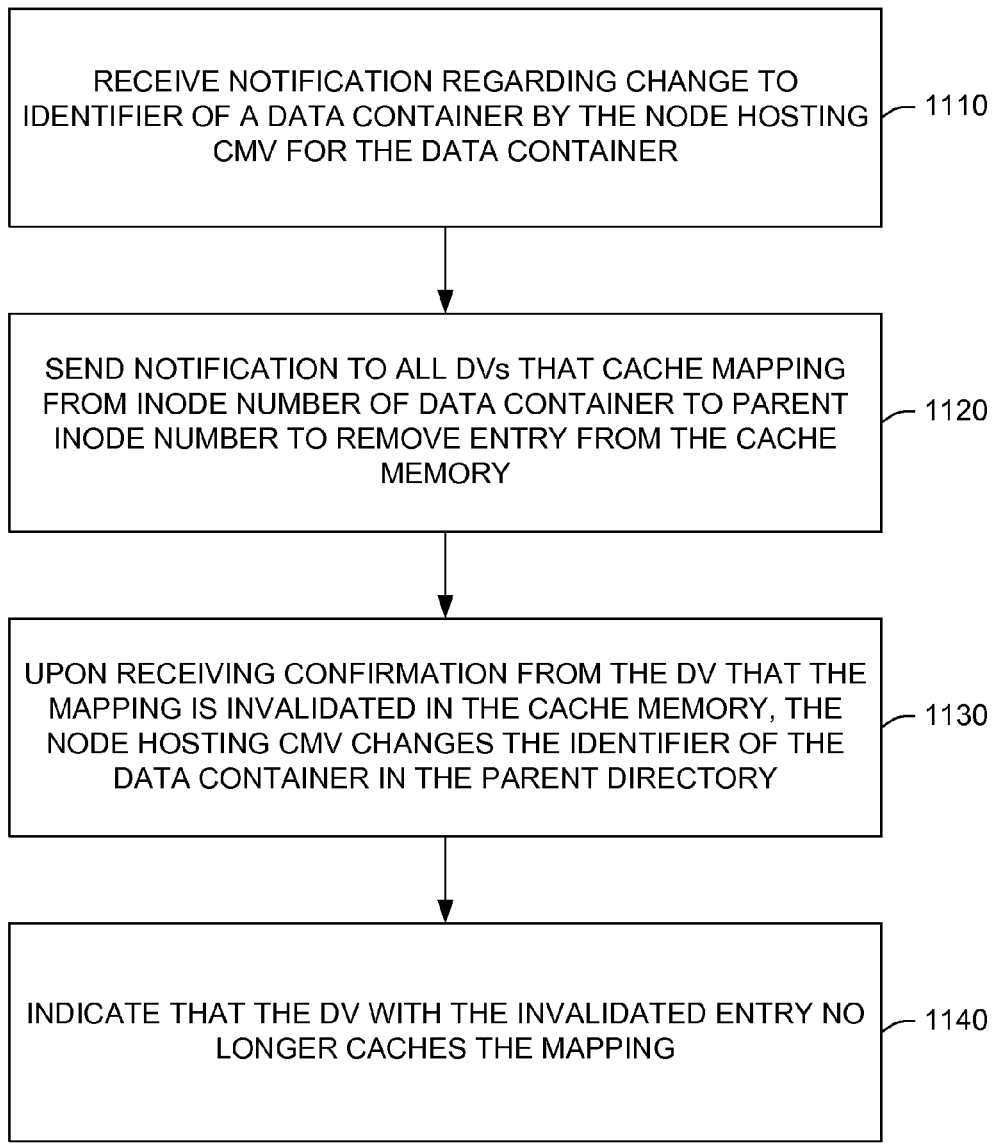
FIG. 11 is a flowchart representation of an overall process of invalidating entries in the cache memory shown in FIG. 10 according to one embodiment.

Referring now to FIG. 11, it illustrates the steps performed by a storage node to invalidate an entry in the cache when a change to an identifier of the inode takes place. When a request to change an inode identifier is received by N-Blade, the request is forwarded to a corresponding D-Blade, which forwards the request to the node hosting CMV for that inode (step 1110). One possible implementation of the mechanism for identifying the CMV for the data container is described in reference to FIG. 8. The CMV then sends an invalidation message to all the DVs that hold a cache of this particular mapping, such as INUM of the inode whose identifier is modified, its immediate parent directory INUM, and an identifier of the inode within the parent directory (step 1120). To this end, in one implementation, the node hosting CMV examines the bitmask (such as the one shown in FIG. 13) to determine which DV caches the entry. The invalidation message requests the DV(s) to remove the entry from the cache memory.

The node(s) that host DV that caches the entry receives the invalidation message. The invalidation message may include the INUM of the data container and the volume ID where the data container resides. The message handler on the node performs the invalidation procedure by e.g., removing the entry from the cache memory. For example, if "sub2" in cache memory was renamed to "sub2_renamed", the entire entry including the INUM 200, parent INUM 100 and "sub2" is removed from the cache memory. FIG. 12 is a diagram illustrating the cache entries after the entry corresponding to "sub2" is removed from the cache.

Upon receiving confirmation from the DVs that the entry has been invalidated, the node hosting CMV changes the identifier of the inode in its parent directory (step 1130). It should be noted that although the identifier, such as a name, is changed, the inode's INUM remains the same. Furthermore, the node hosting the CMV indicates that the DV with the invalidated entry no longer caches the entry (step 1140). In one implementation, this can be accomplished, for example, by updating the bitmask for the DV that invalidated the entry.

Thus, the techniques introduced herein provide an efficient mechanism for reducing remote procedure requests to storage server nodes in a cluster of the storage servers to construct a directory path for a data container. A new caching technique and an efficient organization of the cache memory are provided so that a cache on a storage node is populated with individual path components of a directory structure. A novel invalidation mechanism is provided to maintain cache consistency at the cache so that when a path component changes, such as an identifier of a data container in the directory structure, and a path component is invalidated in the cache memory, the remaining path components can be retained and later reused.

The foregoing description has been directed to particular embodiments of this invention. It will be apparent however, that other variations and modifications may be made to the described embodiments, with the attainment of some or all of their advantages. Furthermore, while this description has been written in terms of N and D-blades, the teachings of the present invention are equally suitable to systems where the functionality of the N and D-blades are implemented in a single system. Alternately, the functions of the N and D-blades may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Those skilled in the art would understand that any attribute other than a name of a data container can be used to issue a lookup request against a data container.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage server. Moreover, the teachings of this invention can be adapted to a variety of storage server architectures including, but not limited to, a network-attached storage environment, a storage area network and disk assembly or other storage device assembly directly-attached to a client or host computer. The term "storage server" should therefore be taken broadly to include such arrangements in addition to any subsystems configured to perform a storage function and associated with other equipment or systems.

What is claimed is:

1. A method for constructing a directory path to a specified path component, comprising:
   iteratively traversing a hierarchical directory structure to populate a cache data structure, of a local storage server node, with one or more entries corresponding to one or more path components until an inode of a specified path component is reached, an entry comprising an inode number of a target inode and an inode number of an immediate parent of the target inode, the cache data structure comprising a first entry derived from data of a first storage server node and a second entry derived from data of a second storage server node, the first storage server node and the second storage server node remote from the local storage server node, the iteratively traversing comprising performing a first traversal and zero or more other traversals until the inode of the specified path component is reached, the performing a first traversal comprising:
   identifying the target inode;
   responsive to determining that the inode number of the immediate parent of the target inode is not cached in the cache data structure:
   identifying a storage server that hosts a content metadata volume for the target inode;

invoking the storage server to identify the inode number of the immediate parent of the target inode;
receiving the inode number of the immediate parent of the target inode and the inode number of the target inode; and
populating the cache data structure with the inode number of the target inode and the inode number of the immediate parent of the target inode; and
constructing a directory path from the target inode to the specified path component based upon one or more entries within the cache data structure without accessing a storage server node remote from the local storage server node.

2. The method of claim 1, comprising:
registering, by the local storage server node, with the first storage server node for update information associated with a first inode associated with the first entry; and
responsive to receiving update information from the first storage server node, modifying the first entry within the cache data structure based upon the update information.

3. The method of claim 2, the modifying comprising at least one of:
modifying a reference to a data container associated with the first storage server node;
adding a reference to a data container associated with the first storage server node; or
removing a reference to a data container associated with the first storage server node.

4. The method of claim 2, the modifying comprising:
invalidating the first entry.

5. The method of claim 2, the modifying comprising:
modifying the first entry based upon a directory change associated with the first inode, the directory change corresponding to at least one of a creation of a data container, a deletion of a data container, or a renaming of a data container associated with the first storage server node.

6. The method of claim 1, comprising:
determining that the hierarchical directory structure is to be parsed based upon a change to the target inode.

7. The method of claim 1, comprising:
determining that the hierarchical directory structure is to be parsed based upon a request for the directory path from the target inode to the specified path component.

8. The method of claim 1, comprising:
terminating the traversal of the hierarchical directory structure based upon identifying the inode number of the specified path component.

9. The method of claim 1, the specified path component corresponding to a parent inode of the target inode.

10. A system for constructing a directory path to a specified path component, comprising:
one or more processors; and
memory comprising instructions that when executed by at least one of the one or more processors implement:
a path traversal engine configured to:
iteratively traverse a hierarchical directory structure to populate a cache data structure, of a local storage server node, with one or more entries corresponding to one or more path components until an inode of a specified path component is reached, an entry comprising an inode number of a target inode and an inode number of an immediate parent of the target inode, the cache data structure comprising a first entry derived from data of a first storage server node and a second entry derived from data of a second storage server node, the first storage server node and the second storage server node remote from the local storage server node, the iteratively traversing comprising performing a first traversal and zero or more other traversals until the inode of the specified path component is reached, the performing a first traversal comprising:
identifying the target inode;
responsive to determining that the inode number of the immediate parent of the target inode is not cached in the cache data structure:
identifying a storage server that hosts a content metadata volume for the target inode;
invoking the storage server to identify the inode number of the immediate parent of the target inode;
receiving the inode number of the immediate parent of the target inode and the inode number of the target inode; and
populating the cache data structure with the inode number of the target inode and the inode number of the immediate parent of the target inode; and
construct a directory path from the target inode to the specified path component based upon one or more entries within the cache data structure without accessing a storage server node remote from the local storage server node.

11. The system of claim 10, the path traversal engine configured to:
register with the first storage server node for update information associated with a first inode associated with the first entry; and
responsive to receiving update information from the first storage server node, modify the first entry within the cache data structure based upon the update information.

12. The system of claim 11, the path traversal engine configured to at least one of:
modify a reference to a data container associated with the first storage server node;
add a reference to a data container associated with the first storage server node; or
remove a reference to a data container associated with the first storage server node.

13. A non-transitory computer-readable medium comprising processor-executable instructions that when executed perform a method for:
iteratively traversing a hierarchical directory structure to populate a cache data structure, of a local storage server node, with one or more entries corresponding to one or more path components until an inode of a specified path component is reached, an entry comprising an inode number of a target inode and an inode number of an immediate parent of the target inode, the cache data structure comprising a first entry derived from data of a first storage server node and a second entry derived from data of a second storage server node, the first storage server node and the second storage server node remote from the local storage server node, the iteratively traversing comprising performing a first traversal and zero or more other traversals until the inode of the specified path component is reached, the performing a first traversal comprising:
identifying the target inode;
responsive to determining that the inode number of the immediate parent of the target inode is not cached in the cache data structure:

identifying a storage server that hosts a content metadata volume for the target inode;

invoking the storage server to identify the inode number of the immediate parent of the target inode;

receiving the inode number of the immediate parent of the target inode and the inode number of the target inode; and populating the cache data structure with the inode number of the target inode and the inode number of the immediate parent of the target inode; and constructing a directory path from the target inode to the specified path component based upon one or more entries within the cache data structure without accessing a storage server node remote from the local storage server node.

14. The non-transitory computer-readable medium of claim 13, the method comprising:

registering, by the local storage server node, with the first storage server node for update information associated with a first inode associated with the first entry; and responsive to receiving update information from the first storage server node, modifying the first entry within the cache data structure based upon the update information.

15. The non-transitory computer-readable medium of claim 14, the modifying comprising at least one of:

modifying a reference to a data container associated with the first storage server node;

adding a reference to a data container associated with the first storage server node; or removing a reference to a data container associated with the first storage server node.

16. The non-transitory computer-readable medium of claim 14, the modifying comprising:

modifying the first entry based upon a directory change associated with the first inode, the directory change corresponding to at least one of a creation of a data container, a deletion of a data container, or a renaming of a data container associated with the first storage server node.

17. The non-transitory computer-readable medium of claim 13, the method comprising:

determining that the hierarchical directory structure is to be parsed based upon a change to the target inode.

18. The non-transitory computer-readable medium of claim 13, the method comprising:

determining that the hierarchical directory structure is to be parsed based upon a request for the directory path from the target inode to the specified path component.

19. A storage server cluster comprising memory comprising instructions that when executed implement:

a path traversal engine configured to:

iteratively traverse a hierarchical directory structure to populate a cache data structure, of a local storage server node, with one or more entries corresponding to one or more path components until an inode of a specified path component is reached, an entry comprising an inode number of a target inode and an inode number of an immediate parent of the target inode, the cache data structure comprising a first entry derived from data of a first storage server node and a second entry derived from data of a second storage server node, the first storage server node and the second storage server node remote from the local storage server node, the iteratively traversing comprising performing a first traversal and zero or more other traversals until the inode of the specified path component is reached, the performing a first traversal comprising:

identifying the target inode;

responsive to determining that the inode number of the immediate parent of the target inode is not cached in the cache data structure:

identifying a storage server that hosts a content metadata volume for the target inode;

invoking the storage server to identify the inode number of the immediate parent of the target inode;

receiving the inode number of the immediate parent of the target inode and the inode number of the target inode; and populating the cache data structure with the inode number of the target inode and the inode number of the immediate parent of the target inode; and construct a directory path from the target inode to the specified path component based upon one or more entries within the cache data structure without accessing a storage server node remote from the local storage server node.

20. The storage server cluster of claim 19, the path traversal engine configured to at least one of:

modify a reference to a data container associated with the first storage server node;

add a reference to a data container associated with the first storage server node; or remove a reference to a data container associated with the first storage server node.

* * * * *